United States Patent [19]

Sato et al.

[11] 4,214,281
[45] Jul. 22, 1980

[54] TAPE RECORDER WITH MEANS FOR DISPLAYING OPERATION MODES IN THE FORM OF CHARACTERS

[75] Inventors: Masanobu Sato; Ken Satoh; Toshihiro Nakao; Kenzi Furuta, all of Hachioji, Japan

[73] Assignee: Olympus Optical Co., Ltd., Tokyo, Japan

[21] Appl. No.: 944,003

[22] Filed: Sep. 20, 1978

[30] Foreign Application Priority Data

Sep. 30, 1977 [JP] Japan .................................. 52-117558

[51] Int. Cl.$^2$ ........................... G11B 5/09; G11B 5/00
[52] U.S. Cl. ........................................ 360/61; 360/137
[58] Field of Search ....................... 360/61, 62, 93, 137, 360/62, 4; 340/644

[56] References Cited

U.S. PATENT DOCUMENTS

| | | | |
|---|---|---|---|
| 3,671,683 | 6/1972 | Rahenkamp et al. | 360/4 |
| 3,800,316 | 3/1974 | Kuharchuk | 360/78 |
| 4,140,896 | 2/1979 | Robertson | 360/137 |

Primary Examiner—Vincent P. Canney

[57] ABSTRACT

A tape recorder with means for displaying operation modes in the form of alphabetic characters is provided with display control switches which are operated interlocking with operation mode control switches including a fast wind switch, a rewind switch, a record switch and a play switch. Upon actuation of these display control switches, a read only memory produces three first code signals. These first code signals are decoded by three decoders and these decoders produce the corresponding second code signals, respectively. The second code signals are applied to a display means where an operation mode corresponding to an operation mode control switch operated is displayed in the form of alphabetic characters.

4 Claims, 2 Drawing Figures

TAPE RECORDER WITH MEANS FOR DISPLAYING OPERATION MODES IN THE FORM OF CHARACTERS

BACKGROUND OF THE INVENTION

The invention relates to a tape recorder with an operation mode display means.

In general, a tape recorder is used in a specified mode such as a fast wind mode, a rewind mode, a record mode or a play mode. If such an operation mode is visualized, it is very convenient for an operator when he operates the tape recorder. By convention, flashing by light emission diodes is used to indicate the operation mode. For example, green flashing by a LED indicates the play mode and red flashing indicates the record operation. In such a display method, however, an operator must be accustomed to its distinction by colors and therefore superflous effort to make the color distinction is necessary. This frequently leads to erronous operation of the tape recorder by an unskillful operator.

Accordingly, an object of the invention is to provide a tape recorder having means for displaying operation modes in the form of characters.

SUMMARY OF THE INVENTION

According to the invention, there is provided a tape recorder with means for displaying operation modes in the form of characters, comprising: a tape recorder body; a mode control switch group mounted onto the tape recorder body and including a plurality of operation mode control switches for controlling the operation modes of the tape recorder; a display control switch group including a plurality of display control switches which are operated interlocking with the corresponding operation control switches; a read only memory which produces first code signals corresponding to a operation mode control switch selectively operated; a decoder group for converting the first code signals into second code signals; and a display means including a plurality of segment display sections for displaying characters corresponding to the second code signals.

With such an arrangement, when a fast wind switch is depressed, characters "FF" are displayed and when a record switch is depressed, characters "REC" are displayed. Accordingly, the operation mode of the tape recorder can correctly be recognized by any person unskilled, thus ensuring a correct and smooth operation of the tape recorder.

Other objects and features of the invention will be apparent from the following description taken in connection with the accompanying drawings, in which:

DETAILED DESCRIPTION OF THE PREFERRED EMBODIMENT

Figure 1:
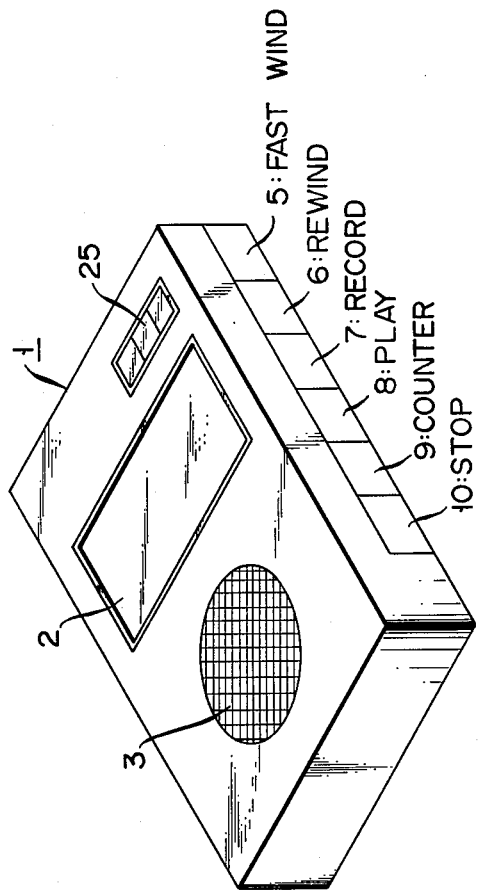
FIG. 1 shows a perspective view of a tape recorder according to the invention.

As shown in FIG. 1, a tape recorder 1 is comprised of a cassette tape holder 2, a speaker 3, and a display section 25. These sections are provided on the upper surface of the tape recorder 1, as viewed in the drawing. The tape recorder 1 is provided at one side with a series of switches such as a fast wind switch 5, a rewind switch 6, a record switch 7, a play switch 8, a counter switch 9 and a stop switch 10.

Figure 2:
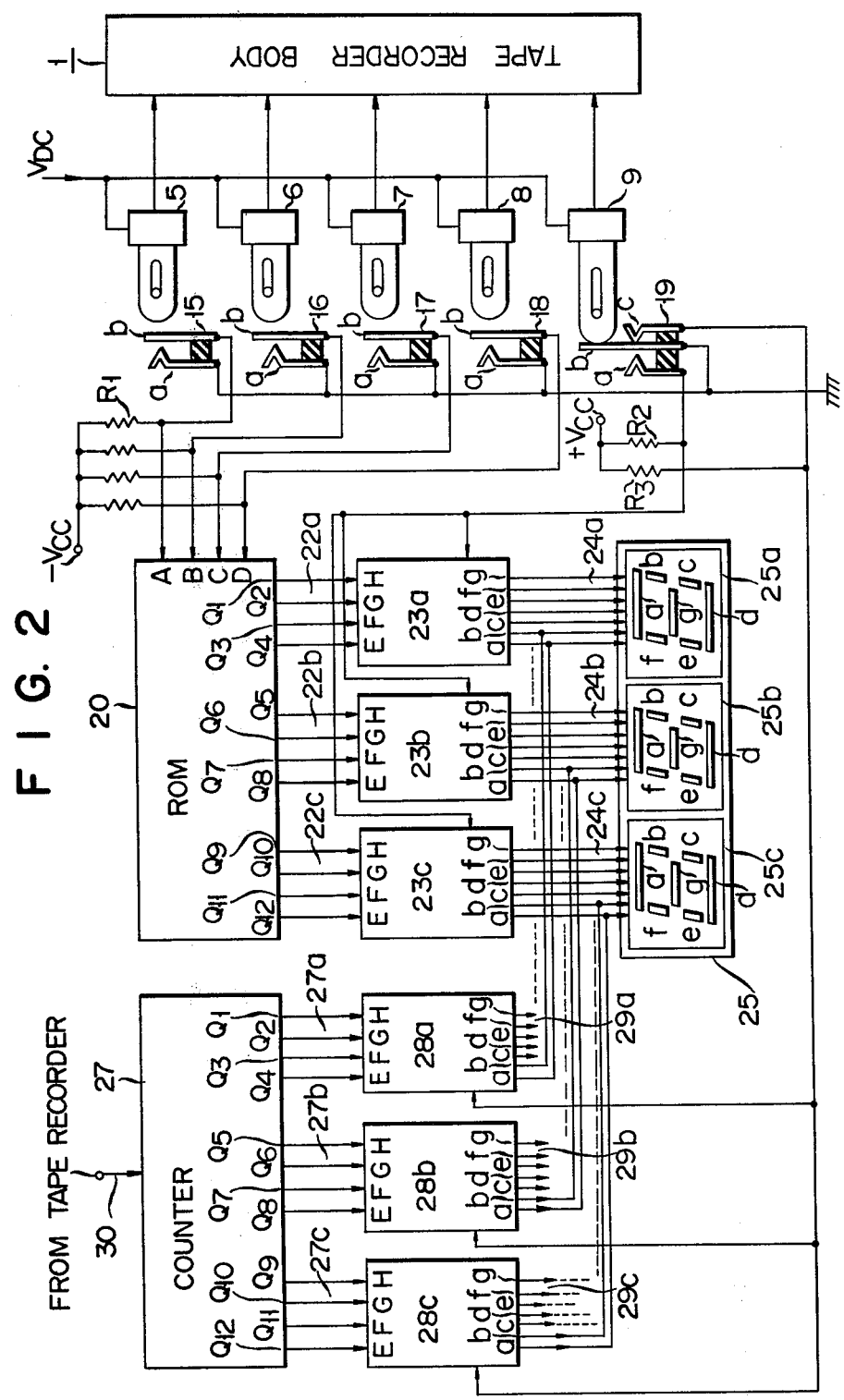
FIG. 2 shows a circuit diagram of an operation mode display section included in the tape recorder shown in FIG. 1.

FIG. 2 shows a circuit diagram of an operation mode display section. Although the circuit is practically included in the tape recorder 1, it is illustrated as if it were formed on the outside of the tape recorder 1. The switches 5, 6, 7 and 8 include locking mechanisms, respectively. When each of them is depressed, it produces a switch signal toward the necessary portions in the tape recorder 1. In the specification, these switches will generally be referred to as operation mode control switches. When one of these operation mode control switches 5 to 8 are depressed, the tape recorder operates in fast wind mode, rewind mode, record mode, or play mode. When the counter switch 9 is positioned as illustrated, the display unit 25 displays the operation mode by characters. When it is depressed, the display unit 25 displays the rotation number of reels in the tape recorder by characters. The stop switch 10 shown in FIG. 1 but not shown in FIG. 2 is provided to release locking mechanisms included in the switches 5 to 9. Normally open switches 15 to 18 are closed when the operation mode control switches 5 to 8 are depressed. These switches 15 to 18 have contacts a and levers b as shown and will generally be referred to as display control switches in this specification. A changeover switch 19, which has contacts a and c and a lever b, is provided related to the counter switch 9. The levers b of the display control switches 15 to 18 are connected to input terminals A, B, C and D of a read only memory (ROM) 20, respectively. Four contacts a and the lever b of the change over switch 19 are commonly connected one another. Connected to the input points A to D of the ROM 20 is a negative voltage −Vcc, through a resistor R1.

The ROM 20 responds to signals applied to the input terminals A, B, C and D to produce first code signals 22a, 22b and 22c each consisting of four bits. Decoders 23a, 23b and 23c are connected at the control terminals to a contact a of the change over switch 19. A positive voltage +Vcc is applied to the contact a of the change over switch 19 through a resistor R2. The same voltage +Vcc is applied to the contact c of the switch 19, through a resistor R3. The decoder 23a converts an input signal 22a into a code signal 24a of seven bits. The decoder 23b converts an input signal 22b into a code signal 24b of 7 bits. The decoder 24c converts an input signal 22c into a seven bits code signal 24c. These code signals 24a to 24c will generally be referred to as second code signals. The display unit 25 is comprised of three segment display sections each including seven segments a to d arranged as shown in the figure. The second code signals 24a to 24c ar supplied to the segment display sections 25a to 25c, respectively.

A counter 27 is used to count the number of rotation of the reel in the tape recorder. The counter 27 counts pulses 30 generated through the rotation of the reel to produce third code signals 27a to 27c each consisting of four bits. These third code signals are converted by the corresponding decoders 28a to 28c into fourth code signals 29a to 29c each consisting of seven bits, respectively. The code signals 29a to 29c are applied to the segment display sections 25a to 25c, respectively. The contact c of the changeover switch 19 is connected to the control terminals of the decoders 28a to 28c.

The operation of the FIG. 2 circuit follows. The truth table of the inputs and outputs of the ROM 20 is shown in Table 1.

Table 1

| SWITCHES | ROM 20 | INPUT | | | | ← OUTPUT 22c → | | | |
|---|---|---|---|---|---|---|---|---|---|
| | | A | B | C | D | Q12 | Q11 | Q10 | Q9 |
| FAST WIND | 5 | H | L | L | L | L | L | H | L |
| REWIND | 6 | L | H | L | L | L | L | L | L |
| RECORD | 7 | L | L | H | L | L | L | L | L |
| PLAY | 8 | L | L | L | H | L | H | L | H |

| ← OUTPUT 22b → | | | | ← OUTPUT 22a → | | | |
|---|---|---|---|---|---|---|---|
| Q8 | Q7 | Q6 | Q5 | Q4 | Q3 | Q2 | Q1 |
| L | L | H | L | H | H | H | H |
| L | H | L | L | L | L | L | H |
| L | H | L | L | H | L | L | L |
| H | L | L | H | H | H | L | L |

When characters R, C, E, F, I, L, P and Y are displayed by the segment display section 25a, the truth table illustrating the relationship between the inputs E to H of the decoder 23a and the outputs a to g is illustrated in Table 2. The same table is correspondingly applicable for remaining decoders 23b and 28c.

Table 2

| CHARACTERS | | INPUT 22a | | | | OUTPUT 24a | | | | | | |
|---|---|---|---|---|---|---|---|---|---|---|---|---|
| | | E | F | G | H | a | b | c | d | e | f | g |
| R | ꓤ | L | L | L | L | H | H | H | L | H | H | H |
| C | ⊏ | H | L | L | L | H | L | L | H | H | H | L |
| E | ⊫ | L | H | L | L | H | L | L | H | H | H | H |
| F | ⊩ | L | L | H | L | H | L | L | L | H | H | H |
| I | ∣ | L | L | L | H | L | L | L | L | H | H | L |
| L | ⌊ | H | L | L | H | L | L | L | H | H | L | L |
| P | ⊓ | L | H | L | H | H | H | L | L | H | H | H |
| Y | ⊔ | H | H | L | L | L | H | H | L | L | H | H |

In this example, when the fast wind switch 5 is depressed, the display sections 25c and 25b display characters "FF," and the display section 25a displays nothing. In this case, the ROM 20 is previosuly set such that the input E to H of the decoder 23a are all at logical level "H" and the outputs a to g are all at logical level "L." Accordingly, the segment display section 25a is not energized. The truth table in this case is omitted in Table 2.

When the counter switch 9 is turned to the position as shown, the lever b and the contact c are in contact with each other. Under this condition, if the record switch 7, for example, is depressed, the logical levels at the terminals A to D are "L L H L" and these at the terminals Q12 to Q1 are "L L L L L H L L H L L L". That is, the inputs of the decoders 23c, 23b and 23a are "L L L L", "L H L L" and "H L L L". As seen from table 2, the segment display section 25c displays a character "R", the display section 25b displays a character "E" and the display section 25a a character "C". Thus, the characters "REC" are displayed by the display unit 25. Therefore, an operator can surely know that the tape recorder is operated in record mode. Similarly, when the play switch 8 is depressed, the display unit 25 displays characters "PLY" (in this case, "Y" is expressed in the form of "⊔"). When the fast switch 5 is depressed, "FF" is displayed. "REI" is displayed for the depression of the rewind switch 8. Such is seen from the truth tables in Tables 1 and 2. Therefore, any unskilled person can correctly and smoothly operate the tape recorder.

When the counter switch 9 is depressed, the lever b and the contact a come in contact with each other. Accordingly, a control signal of "L" level is applied to the decoders 23a, 23b and 23c so that the outputs a to g are not applied to the display unit 25. In this case, the lever b contacts the contact a of the switch 9 so that the decoders 28a, 28b and 28c are driven and then the outputs a to g of these decoders are applied to the display units 24a to 24c. Accordingly, the display unit 25 displays the output of the counter, that is, the number of the reel rotation.

As described above, the above-mentioned example employs the display unit of three sections and the operation mode or the output of the counter 27 is displayed through a switch 9. The invention is not limited to such an example. For example, the counter switch 9 may be omitted and only the operation mode may be displayed. Additionally, another display unit of six sections may be used in which upper three sections are used for displaying the operation mode and the lower three sections for displaying the output of the counter 27.

What we claim is:

1. A tape recorder with means for displaying operation modes in the form of characters comprising:
   a tape recorder body;
   a mode control switch group which is mounted on said tape recorder body and includes a plurality of operation mode control switches to control operation modes of the tape recorder, said operation modes being fast rewind, rewind, record, or play;
   a display control switch group including a plurality of display control switches which are operated interlocking with said operation mode control switches;
   a read only memory for producing first code signals corresponding to an operation mode control switch selectively operated;
   a first decoder group for converting said first code signals into second code signals; and
   display means including a plurality of segment display sections for displaying alphabetic characters corresponding to said second code signals.

2. A tape recorder according to claim 1, in which said operation mode control switch group includes a fast wind switch, a rewind switch, a record switch and a play switch; said read only memory which receives outputs from four display control switches corresponding to said four operation mode control switches and produces three first code signals; said first decoder group includes three decoders each of which converts the corresponding first code signal into a second code signal consisting of seven bits which in turn is applied to the corresponding segment display section of said display unit.

3. A tape recorder according to claim 2, in which said segment display sections display an operation mode in the form of alphabetic characters such as "FF," "REI," "REC" or "PLY" when said fast wind switch, rewind switch, record switch or play switch is depressed.

4. A tape recorder according to claim 1, further comprising:

a counter which counts the rotational number of the reel of the tape recorder and produces third code signals representing the count;

a second decoder group which converts said third code signals into fourth code signals which in turn are applied to said display means;

a counter switch for selectively applying the outputs of said first decoder group and said second decoder group to said display means.

* * * * *